(12) United States Patent
Gochnour et al.

(10) Patent No.: US 6,865,086 B2
(45) Date of Patent: Mar. 8, 2005

(54) APPARATUS AND METHOD TO SECURE AN ADAPTOR TO A REDUCED-SIZED MEMORY CARD

(75) Inventors: Derek J. Gochnour, Boise, ID (US); Walter L. Moden, Meridian, ID (US); Michael W. Morrison, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 84 days.

(21) Appl. No.: 10/191,139

(22) Filed: Jul. 9, 2002

(65) Prior Publication Data

US 2004/0009708 A1 Jan. 15, 2004

(51) Int. Cl.[7] ............................................. H05K 5/02
(52) U.S. Cl. ..................................... 361/737; 235/492
(58) Field of Search ................................ 361/737, 728, 361/752, 730, 736, 740; 235/492

(56) References Cited

U.S. PATENT DOCUMENTS

| | | | |
|---|---|---|---|
| 5,513,074 A | * | 4/1996 | Ainsbury et al. |
| 5,516,074 A | * | 5/1996 | Hung ........................ 248/634 |
| 5,528,459 A | * | 6/1996 | Ainsbury et al. ........... 361/737 |
| 5,933,328 A | | 8/1999 | Wallace et al. |
| 6,050,848 A | * | 4/2000 | Yao |
| 6,097,605 A | | 8/2000 | Klatt et al. |
| 6,099,337 A | | 8/2000 | Chan |
| 6,175,505 B1 | | 1/2001 | Cheng et al. |
| 6,219,215 B1 | * | 4/2001 | Bertin et al. ............... 361/93.8 |
| 6,219,256 B1 | * | 4/2001 | Wu |
| 6,227,893 B1 | | 5/2001 | Kaneko |
| 6,247,947 B1 | | 6/2001 | Knoernschild et al. |
| 6,264,506 B1 | | 7/2001 | Yasufuku et al. |
| 2003/0231472 A1 | * | 12/2003 | Tseng et al. |
| 2003/0231742 A1 | * | 12/2003 | Huang ........................ 379/21 |

\* cited by examiner

Primary Examiner—David Martin
Assistant Examiner—Dameon E. Levi
(74) Attorney, Agent, or Firm—TraskBritt

(57) ABSTRACT

An apparatus and method of removably interconnecting a reduced-sized memory card with an extension member. The locking mechanism may be formed in a peripheral end portion of the reduced-sized memory card that may include an entry surface and a ledge. The extension member may include a biasing portion that slidably engages the entry surface and removable interconnects with the ledge. With this arrangement, the extension member may easily be secured and removed from the reduced-sized memory card, allowing easy interchangeability between a standard-sized socket of one electronic device and a reduced-sized socket of another electronic device.

75 Claims, 12 Drawing Sheets

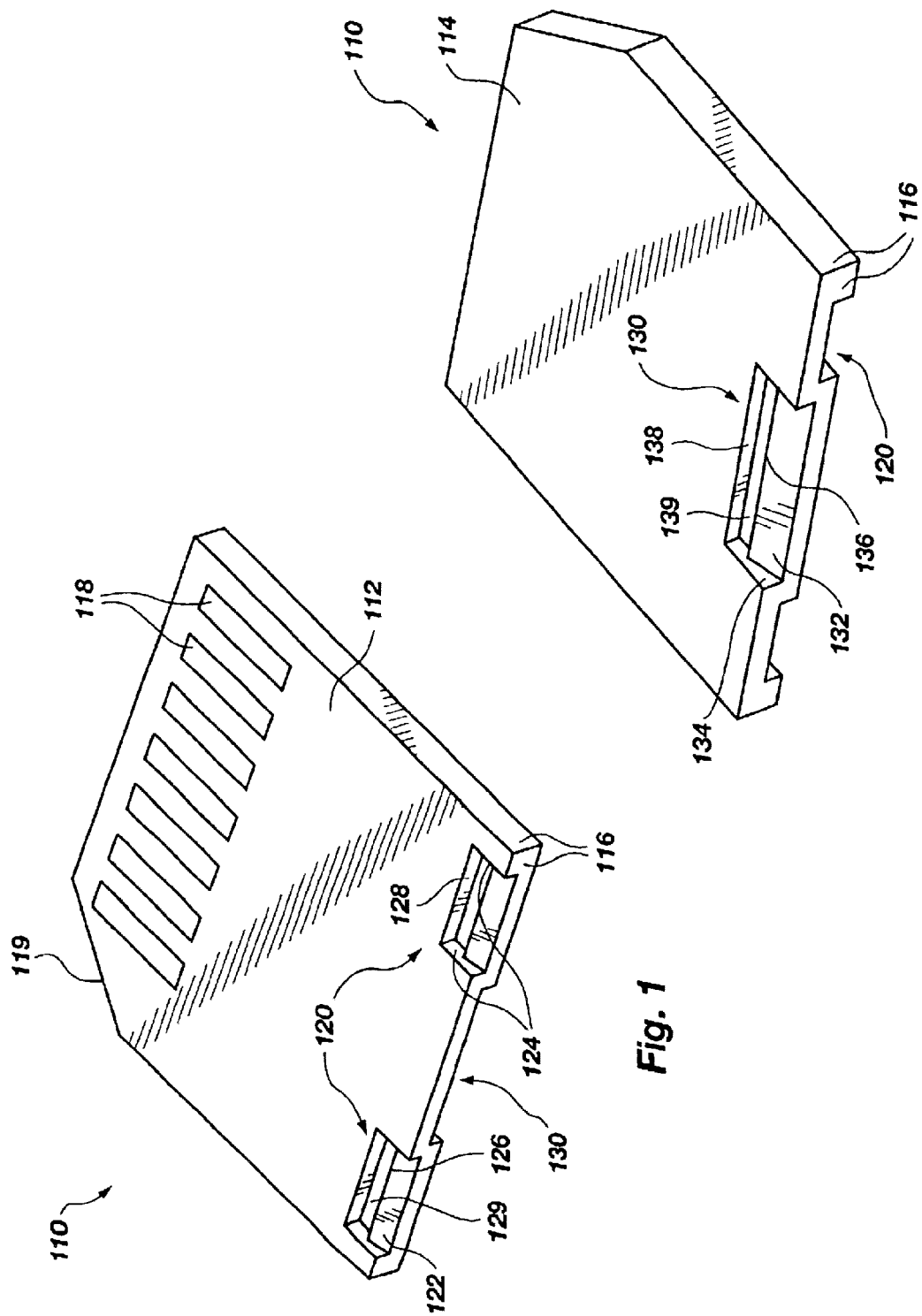

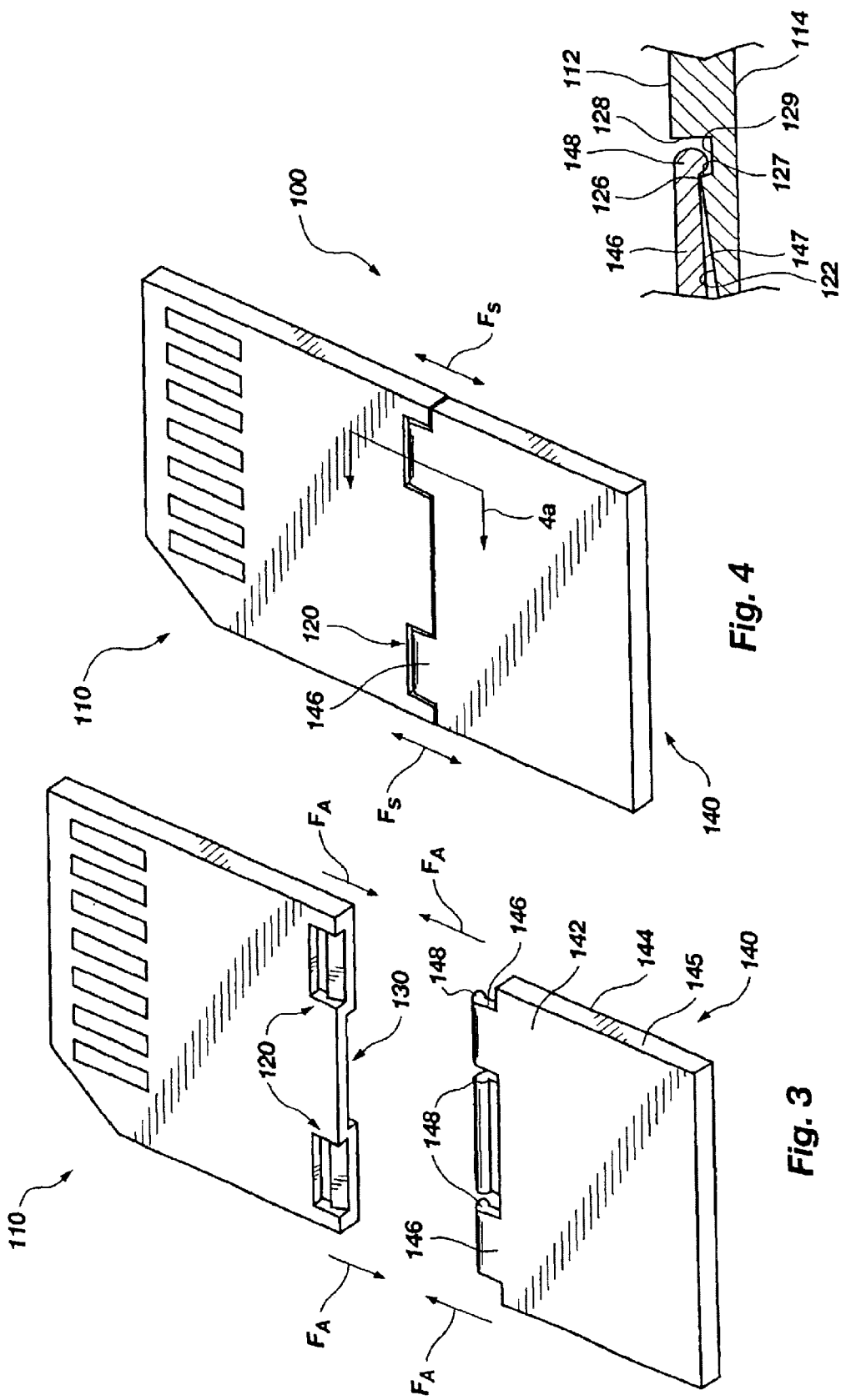

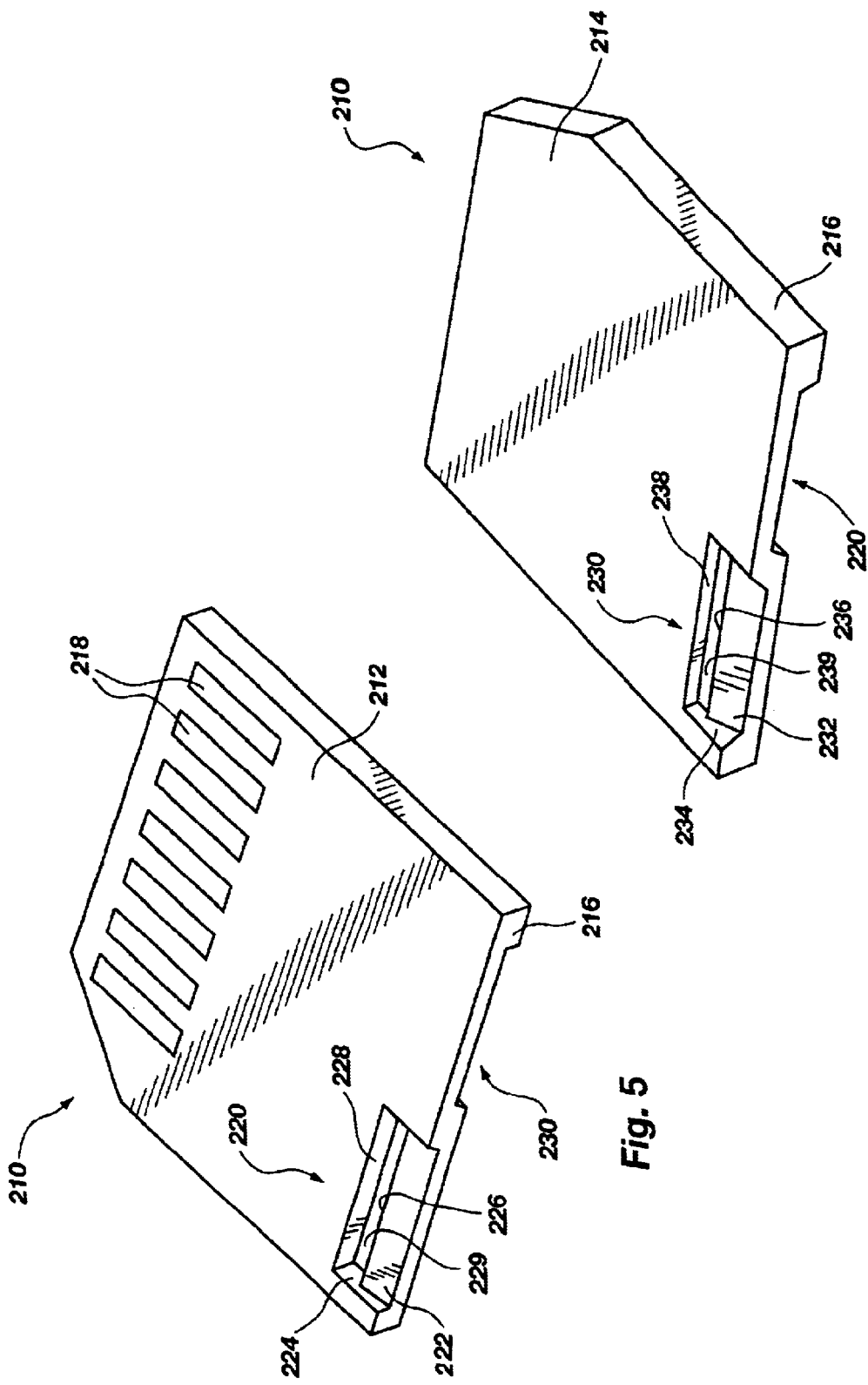

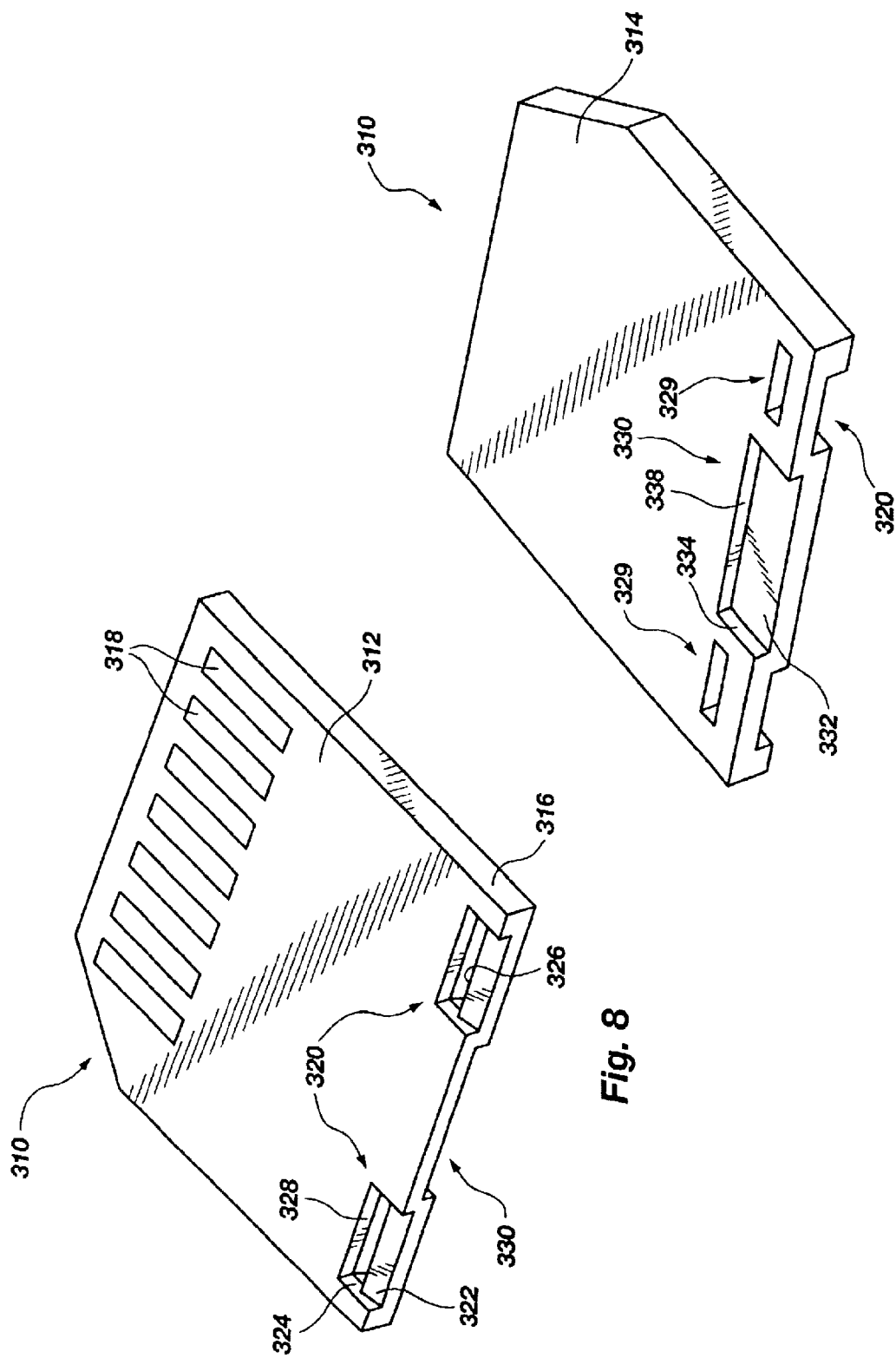

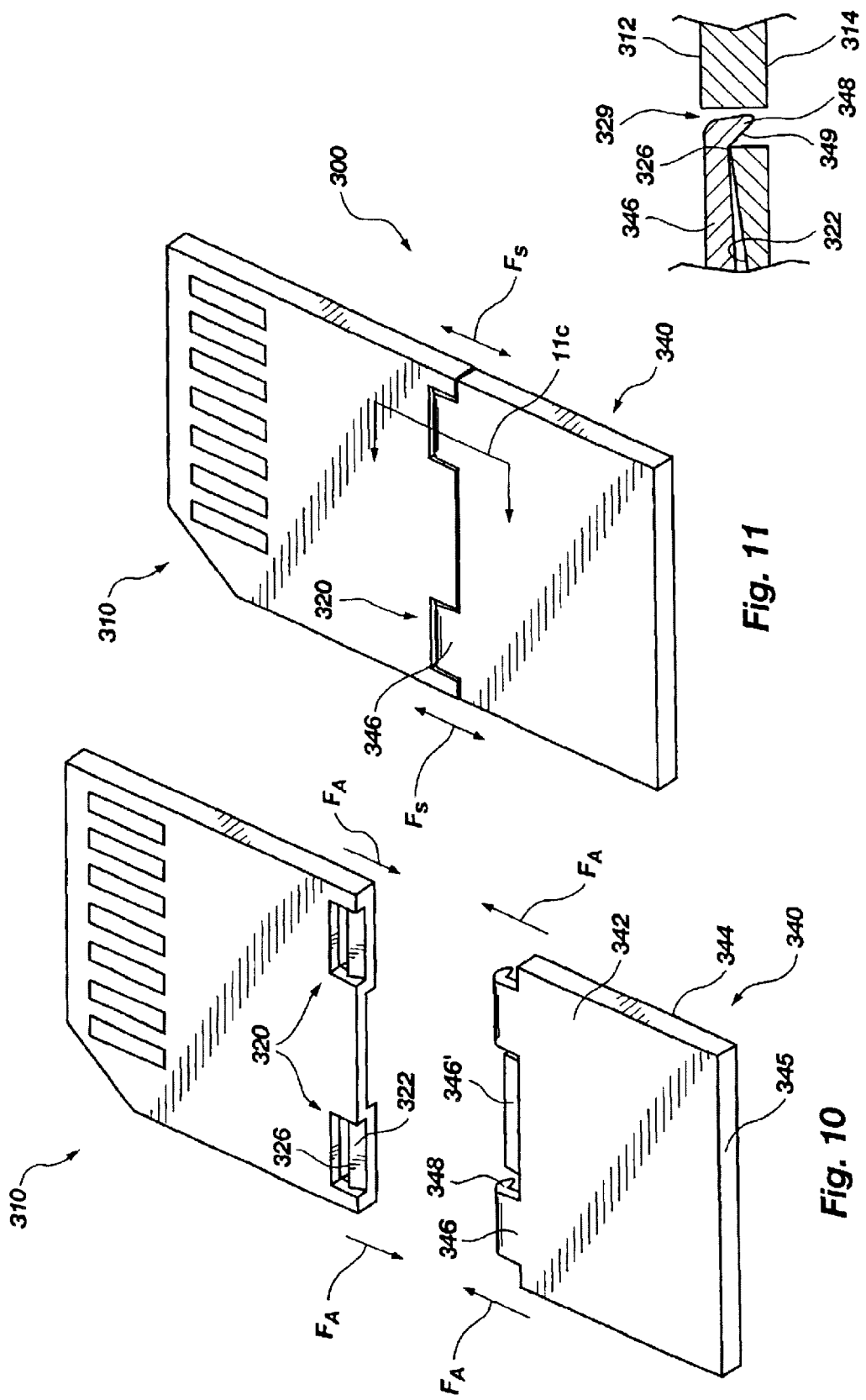

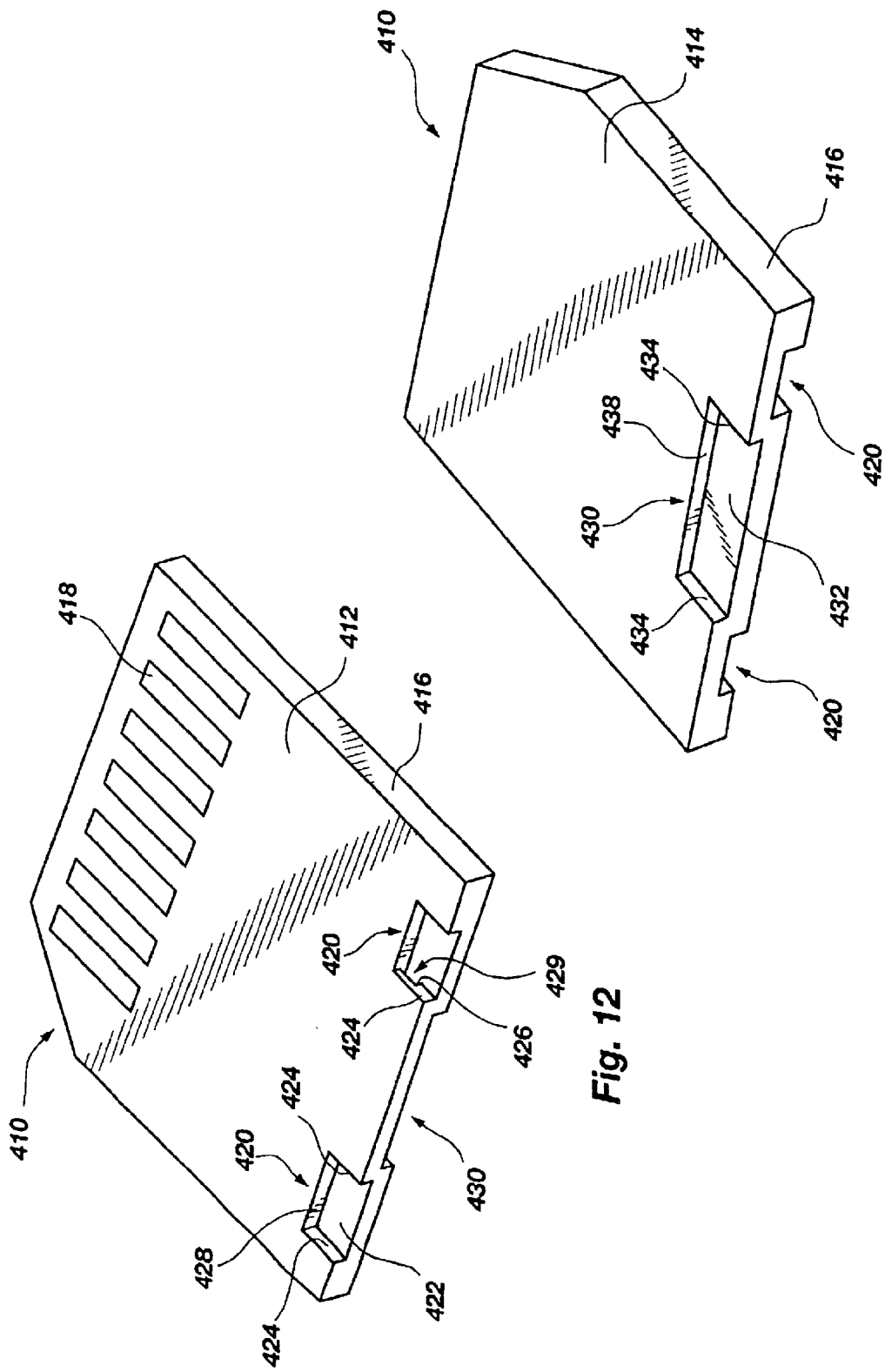

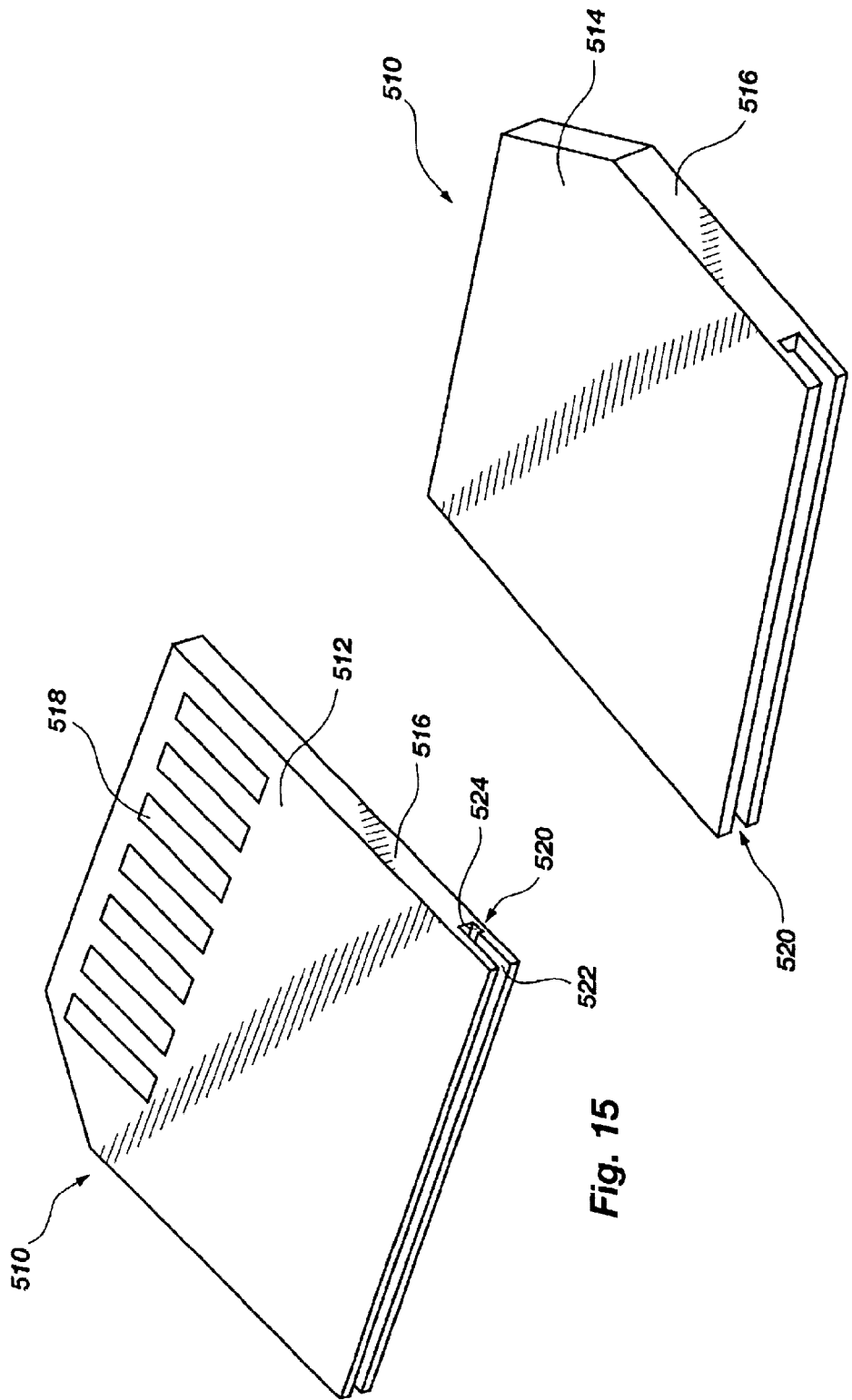

APPARATUS AND METHOD TO SECURE AN ADAPTOR TO A REDUCED-SIZED MEMORY CARD

BACKGROUND OF THE INVENTION

1. Field of the Invention

The present invention relates generally to the use of integrated circuit cards and, more particularly, the present invention relates to methods and apparatus of removably securing an adaptor to an integrated circuit memory card.

2. State of the Art

In the field of computer technology, multimedia applications have a steadily growing market share. A medium known in the art for retrofitting various electronic devices for such multimedia applications is the memory card. Examples of various memory cards in the market include the MultiMedia Card ("MMC"), SmartMedia, Miniature Card and Memory Stick.

The memory card is generally a substantially rectangular, thin, planar card containing a memory chip and integrated circuitry sealed therein. The memory card typically includes packaging of a thermoset resin with a plurality of terminals in a line exposed on a face and proximate an edge of the memory card. One corner of the memory card is typically beveled so as to prevent the card from being inserted incorrectly into an electronic system.

There are various types of electronic devices that incorporate the memory card, such as personal digital assistants ("PDAs"), cell phones, digital cameras, printers and desk-top and lap-top computers. Different brands of such electronic devices utilize particular types of memory cards, each such electronic device including a memory card socket configured to receive a corresponding memory card with corresponding dimensions. For example, the dimensions of the MMC is 24×32×1.4 (mm). The memory card socket in an electronic device, such as a digital camera, made to receive the MMC corresponds to the dimensions of such MMC. The same is true for the SmartMedia card with dimensions of 37×45×0.76 (mm), the Miniature Card with dimensions of 38×33×3.5 (mm), and the Memory Stick with dimensions of 50×21.5×2.8 (mm).

One of the advantages of the memory card is its interchangeability in being utilized in different types of electronic devices. For example, a digital camera configured to receive the MultiMedia Card may be configured to store digital photographs. That same card may then be inserted into a computer or a device that is itself then inserted or connected to a computer to download the digital photographs, or such memory card may be utilized in a cell phone for one function and then transferred to another electronic device such as a personal data assistant for a second function. Thus, the success of the memory card in the market has been largely due to the interchangeability of the memory card from one electronic device to another.

Recently, some of the more ultra compact electronic devices, such as cell phones, digital cameras, etc., have introduced memory card sockets dimensioned as half-sized sockets for inserting a half-sized memory card, such term also encompassing a memory card with reduced dimensions which is not necessarily half the size of the standard memory card. Such a half-sized memory card is being developed by EEMS in Rieti, Italy, and is referred to as an RS-MMC. Although such a half-sized memory card provides a much more compact card for use with an ultra compact electronic device, the half-sized memory card is not practical in its interchangeability in those electronic devices configured to receive the standard-sized memory card. For example, the half-sized memory card may be functional in the standard-sized memory card socket; however, the standard-sized socket may not be configured to allow easy removability of the half-sized memory card from such standard-sized socket. In other words, the half-sized memory card may be inserted into the socket and function properly, but because of its reduced size, the standard-sized socket may not release the half-sized memory card so that it is removable from the electronic device, or may prevent easy access to the half-sized memory card for removal from the socket.

This problem has been recognized by EEMS of Rieti, Italy, which has been developing an adaptor for attaching to their half-sized memory card. The half-sized memory card includes three connector recesses in an end portion thereof. Each connector recess includes a male protrusion projecting from a surface in the recess. The male protrusion is configured to correspond and lock to the adaptor. Due to the already limited size of the memory card, such a male protrusion is extremely small and, therefore, the male protrusion is susceptible to breaking. Failure of the male protrusion may result from fatigue due to reoccurring cycles of removing and reattaching the adaptor with the half-sized memory card when interchanging between electronic devices equipped with half-sized sockets and standard-sized sockets. For example, due to the minute size of the male protrusion, it is anticipated that such a male protrusion may only have a cyclic life of about one or two cycles. Furthermore, replacing the half-sized memory card due to male protrusion fatigue and failure is expensive in comparison to the cost of replacing, for example, the adaptor.

Therefore, it would be advantageous to provide a fatigue-resistant locking mechanism between a half-sized memory card and an adaptor to accommodate the potential for numerous cycles of interchanging the adaptor with the half-sized memory card. It would also be advantageous to provide a locking mechanism configuration wherein the least potential for failure is in the half-sized memory card.

BRIEF SUMMARY OF THE INVENTION

The present invention relates to methods and apparatus for removably interconnecting a memory card to an extension member. The present invention is directed to a locking mechanism formed in an end portion of the memory card, allowing easy removable interconnection with the extension member.

The memory card includes a first surface and a second surface and a peripheral side defining a thickness between the first surface and second surface. At least one of the first surface and the second surface includes terminals exposed thereon, which terminals interconnect with integrated circuitry within the memory card. According to the present invention, the locking mechanism includes at least one recess defined in the first surface of the end portion and at least one recess defined in the second surface of the end portion. The at least one recess in the first surface includes an entry surface and a ledge, wherein the entry surface extends from the peripheral side to the ledge.

The extension member includes a first surface and a second surface with resilient biasing portions extending from an end of the extension member in the plane thereof. At least one of the biasing portions includes an end portion configured to slidably engage with the entry surface in at least one of the recesses and also removably interconnect with the ledge in the at least one recess. With this arrangement, the memory card is removably interconnected to the extension member, by which the entry surface is configured to slidably engage with at least one biasing portion extending from the extension member, and the ledge is configured to removably secure the at least one biasing portion extending from the extension member. Such removable interconnection between the memory card and the extension member allows the memory card to be easily interchangeable between an electronic device having a standard-sized memory card socket and another electronic device having a reduced-sized memory card socket by simply either securing or removing the memory card from the extension member.

In an aspect of the present invention, the entry surface may include a ramp extending to the ledge. The entry surface may be a substantially protrusion-free surface and/or a substantially unobstructed surface to the extent that the entry surface is configured to slidably receive the biasing portion from the peripheral side to the ledge of the recess.

In a first embodiment, the at least one recess in the first surface and the second surface includes an upper floor comprising the entry surface and a lower floor, which each sit between lateral side walls. The upper floor and the lower floor are separated by a ledge wall and the lower floor extends to a back wall. This first embodiment includes two recesses in the first surface and one recess in the second surface, which are each configured to slidably engage and removably interconnect with at least one biasing portion extending from the extension member. The recess in the second surface is arranged between the two recesses in the first surface. With this arrangement, the two recesses in the first surface and the one recess in the second surface provide a three-point engagement with the extension member.

In a second embodiment, or variation of the first embodiment, the at least one recess in the first surface and the second surface are similar to the recesses of the first embodiment, except the second embodiment includes one recess in the first surface and one recess in the second surface in a staggered relationship for a two-point engagement with the extension member.

In a third embodiment, there are two recesses in the first surface similar to the first embodiment, except instead of a lower floor, there is a through hole provided for each of the two recesses which extends to the second surface of the memory card. The recess in the second surface includes a floor extending to lateral side walls and a back wall and is centrally located at the end portion of the package between the through holes. Each of the recesses in the first surface and the second surface are configured to slidably engage with biasing portions extending from the extension member, wherein the two recesses in the first surface are configured to removably interconnect with end portions on the biasing portions which extend into the through hole in the interconnected position. The two recesses in the first surface and the single recess in the second surface provide a three-point contact including two points of engagement and an alignment point with the extension member.

In the fourth embodiment, there are two recesses in the first surface and one recess in the second surface. The two recesses in the first surface include a floor defined by lateral sidewalls and a back wall. In this embodiment, one of the lateral side walls in each of the two recesses includes the entry surface and the ledge, wherein a biasing portion slidably engages one of the lateral side walls and interconnects with the ledge therein. The recess in the second surface may include a floor extending to lateral side walls and a back wall, which recess is configured to slidably engage with at least one of the biasing portions extending from the extension member. In this manner, the fourth embodiment provides a three-point engagement with the extension member.

The fifth embodiment of the present invention is configured such that the end portion of the memory card includes a track for slidably engaging with the extension member. The track is formed as a slot defined from one peripheral side to an opposing peripheral side. Alternatively, the slot may fall short from extending through to the opposing peripheral side. The slot may include a track recess extending along a length of the slot. With this fifth embodiment, the extension member also includes a track member along an end portion of the extension member. The track member is sized and configured to transversely slide into the slot in the memory card for reversibly interconnecting therewith.

In another aspect of the present invention, the memory card with attached extension member is inserted in a memory card socket in an electronic system. In the electronic system, the memory card is electrically connected to a processor device which electrically communicates with an input device and an output device.

BRIEF DESCRIPTION OF THE SEVERAL VIEWS OF THE DRAWINGS

While the specification concludes with claims particularly pointing out and distinctly claiming that which is regarded as the present invention, the advantages of this invention may be ascertained from the following description of the invention when read in conjunction with the accompanying drawings, wherein:

FIGS. 1 and 2 illustrate a simplified perspective view of a reduced-sized memory card, depicting a locking mechanism on a peripheral front side surface of the card and a peripheral back side surface of the card, respectively, according to a first embodiment of the present invention;

FIG. 3 illustrates a simplified perspective view of an extension member and the reduced-sized memory card in an unassembled position, according to the first embodiment of the present invention;

FIG. 4 illustrates a simplified perspective view of the reduced-sized memory card assembled with the extension member, according to the first embodiment of the present invention;

FIG. 4a illustrates a cross-sectional view taken along line 4a in FIG. 4, depicting a biasing portion of the extension member engaged with a recess portion of the reduced-sized memory card, according to the first embodiment of the present invention;

FIGS. 5 and 6 illustrate a simplified perspective view of a reduced-sized memory card, depicting a locking mechanism on a peripheral front side surface of the memory card and a peripheral back side surface of the memory card, respectively, according to a second embodiment of the present invention;

FIGS. 8 and 9 illustrate a simplified perspective view of a reduced-sized memory card, depicting a locking mechanism on a peripheral front side surface of the card and a peripheral back side surface of the card, respectively, according to a third embodiment of the present invention;

FIG. 10 illustrates a simplified perspective view of an extension member and the reduced-sized memory card in an unassembled position, according to the third embodiment of the present invention;

FIG. 11 illustrates a simplified perspective view of the reduced-sized memory card assembled with the extension member, according to the third embodiment of the present invention;

FIG. 11a illustrates a cross-sectional view taken along line 11a in FIG. 11, depicting a biasing portion of the extension member engaged with a recess portion of the reduced-sized memory card, according to the third embodiment of the present invention;

FIGS. 12 and 13 illustrate a simplified perspective view of a reduced-sized memory card, depicting a locking mechanism on a peripheral front side surface of the memory card and a peripheral back side surface of the memory card, respectively, according to a fourth embodiment of the present invention;

FIGS. 15 and 16 illustrate a simplified perspective view of a front side surface and a back side surface, respectively, of a reduced-sized memory card, depicting a locking mechanism on a peripheral portion of the memory card, according to a fifth embodiment of the present invention;

DETAILED DESCRIPTION OF THE INVENTION

Figure 7:
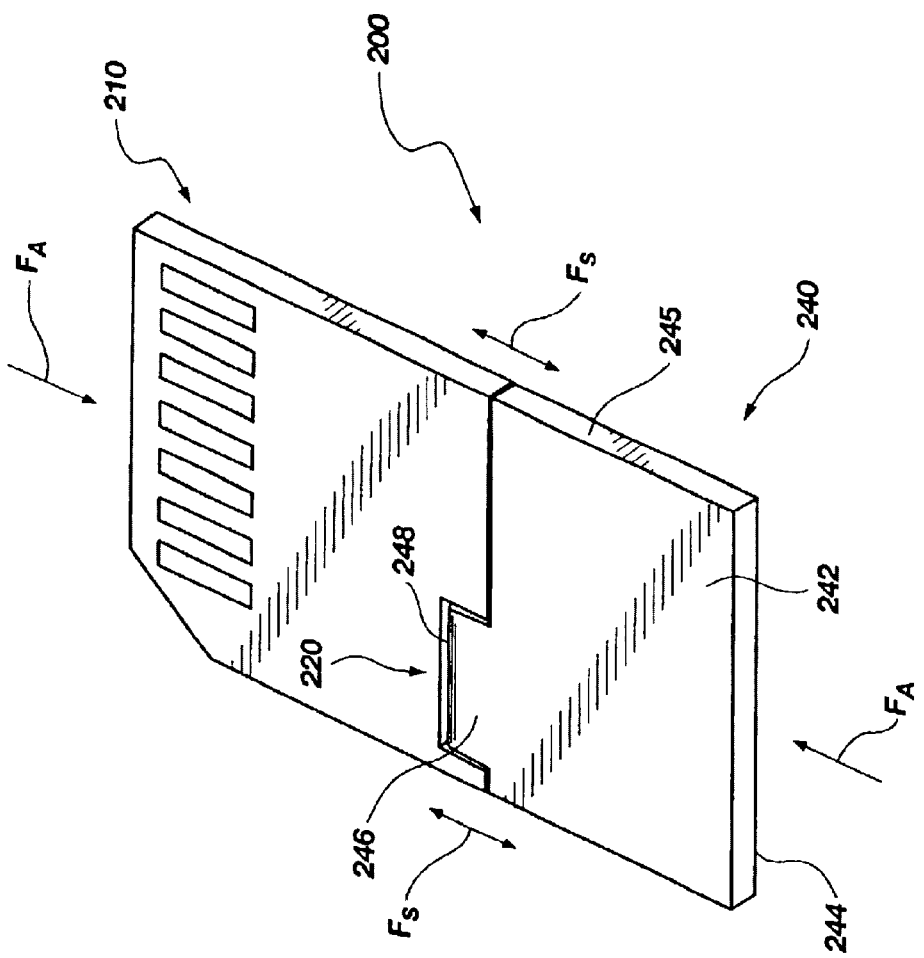
FIG. 7 illustrates a simplified perspective view of the reduced-sized memory card assembled with the extension member, according to the second embodiment of the present invention.

Embodiments of the present invention will be hereinafter described with reference to the accompanying drawings. It should be understood that these illustrations are not to be taken as actual views of any specific apparatus or method of the present invention, but are merely exemplary, idealized representations employed to more clearly and fully depict the present invention than might otherwise be possible. Additionally, elements and features common between the drawing figures retain the same numerical designation.

FIGS. 1 and 2 illustrate respective front and back perspective views of a memory card 110 or otherwise referred to as a half-sized or reduced-sized memory card due to its reduced size from a standard-sized memory card. Memory card 110 may be configured as, but reduced in size (elongation) from, any type of memory card, such as the standard-sized memory cards including MultiMedia Card ("MMC") and Memory Stick.

Memory card 110 is a generally rectangular, thin, planar card having integrated circuitry sealed therein and packaged with, for example, a thermoset resin as known in the art. The memory card 110 includes a front surface 112 and a back surface 114 thereof. The memory card 110 includes a peripheral side 116 defining a card thickness between the front surface 112 and the back surface 114 of the memory card 110. The front surface 112 may include a plurality of terminals 118 (typically seven terminals) exposed thereon which interconnect to the integrated circuitry in the memory card 110. One corner 119 of the card 110 may be beveled so as to prevent the card from being inserted into its intended electronic device in an incorrect rotational orientation. Such electronic devices may include personal digital assistants, digital cameras, cell phones, MP3 players, printers and desk-top and lap-top computers, or any other electronic device or system configured to use a memory card 110.

According to a first embodiment of the present invention, a locking mechanism in the memory card 110 comprises recesses formed in the front surface 112 and the back surface 114 thereof. In particular, at an end portion of the memory card 110 (opposite the end having the terminals 118), the front surface 112 may include front recesses 120 formed partially in the peripheral side 116 and partially in the front surface 112 of the memory card 110. Also at the end portion of the memory card 110 on the back surface 114 thereof, a back recess 130 may be formed partially in the peripheral side 116 and partially in the back surface 114 of the memory card 110. As depicted, the back recess 130 is centrally arranged between two front recesses 120 in the end portion of the memory card 110.

The front recesses 120 may be defined with an upper floor 122, a lower floor 129, lateral side walls 124 and a back wall 128. The upper floor 122 may ramp upwardly in elevation from the entrance of the front recess 120, as shown. The upper floor 122 in the front recesses 120 extends laterally to the lateral side walls 124 and extends from the peripheral side 116 to a ledge 126. The ledge 126 separates the upper floor 122 and lower floor 129, wherein the ledge 126 extends to a ledge wall 127 (see FIG. 4(a)) and then to the lower floor 129. The lower floor 129 may be defined by the lateral side walls 124, the back wall 128, and the ledge wall 127.

The back recess 130 may be configured similarly to the front recesses 120, wherein the back recess 130 may include an upper floor 132, a lower floor 139, lateral side walls 134 and a back wall 138 with a ledge 136 separating the upper floor 132 and the lower floor 139. Alternatively, the back recess 130 may also be formed with a single, flat floor extending to lateral side walls 134 and back wall 138.

Turning to FIG. 3, an extension member 140 and the memory card 110 are illustrated in an unassembled position. Extension member 140 includes a first surface 142 and a second surface 144 with a peripheral side surface 145 therebetween. Extending from one end of the extension member 140 at the peripheral side surface 145 and generally in the plane of the extension member may be one or more biasing members or portions 146. Preferably, there is a biasing portion 146 configured to removably interconnect with each corresponding recess, i.e., front recesses 120 and back recess 130, in the memory card 110. Each biasing portion 146 may include an end portion 148, which is preferably structured as, but not limited to, a rounded protrusion that may extend outwardly from an inner surface 147 (see FIG. 4(a)) of the biasing portion 146 and may extend along a lateral width of the biasing portion 146.

The extension members 140 and biasing portions 146 may be formed from any known flexibly resilient material, such as a polymeric material, a composite material, or spring steel, and combinations thereof. The biasing portions 146 may be formed separately from and then attached to the body of extension member 140 or the biasing portions 146 and extension member 140 may be formed together as a single unit using a mold such as an injection mold or formed by any other suitable method known in the art. For example, the biasing portions 146 may comprise members of appropriately formed spring steel attached to the body of extension member 140 by injection molding or over molding the body onto extensions of biasing members 146 into the mold cavity.

As illustrated in FIGS. 3 and 4, the memory card 110 and extension member 140 may be removably interconnected, which may be by manual or automated means as shown by arrows $F_A$ and $F_S$ depicted therein respectively indicating connection and disconnection to recesses applied in the plane of the mutually aligned memory card 110 and extension member 140. With the biasing portions 146 being flexibly resilient away from the plane of the extension member 140, such biasing portions 146 may mate with the corresponding front recesses 120 and back recess 130. To interconnect the biasing portions 146 with the corresponding recesses, the end portion 148 for each biasing portion 146 aligns with and slidably engages the corresponding upper floors 122 and 132 in the front and back recesses 120 and 130, respectively. The end portions 148 may be moved with an attaching force $F_A$, slidably engaging with the respective front and back recesses 120 and 130 until the end portions 148 move over the respective ledges 126 and 136 in the recesses 120 and 130, to thereby removably interconnect with the recesses 120 and 130 in a fully engaged position, as illustrated in FIG. 4. The first embodiment therefore provides a three-point engagement between the front recesses 120 and back recess 130 of the memory card 110 and the biasing portions 146 of the extension member 140.

As shown in FIG. 4a, taken along line 4a in FIG. 4, a portion of the inner surface 147 of the biasing portion 146 directly abuts with the upper floor 122 in the recess 120 with the end portion 148 in the fully engaged position. To succeed to such position, the end portion 148 slidably engages the upper floor 122 until the end portion 148 slides over the ledge 126 and interconnects therewith. The upper floor 122 may be substantially continuously planar or may be arcuate in a shallow curve of increasing steepness toward ledge 126, and ramps upward toward the ledge 126, resulting in the biasing portion 146 being forced upwardly away from the plane of the extension member 140 toward the upper floor 122 with increasing force as the end portion 148 moves toward the ledge 126. Alternatively, the upper floor 122 may also be formed substantially flat without a sloping ramp shape and be configured so that the biasing portion 146 maintains a substantially constant biasing force as the end portion 148 slidably engages the upper floor 122 and moves into the fully engaged position. The upper floor 122 preferably does not include any impeding protrusions or abutments to the extent that such protrusions and abutments would prevent the end portion from sliding smoothly thereon into the fully engaged position.

It can therefore be well appreciated by one of ordinary skill in the art that the front recesses 120 and back recess 130 of the present invention enables reliable removable interconnection between the memory card 110 and the extension member 140. Specifically, the rounded structure protruding outward beyond the inner surface 147 of each of the biasing portions 146 provides interconnection to the recesses 120 and 130 via engagement with the ledge 126 as well as allowing the extension member 140 to be easily removed from the memory card 110 by applying a separating force Fs, as shown by the outward arrows in FIG. 4, to overcome the resilient bias of biasing portions 146.

The dimensions of the combined memory card 110 and extension member 140, designated as 100, are substantially equivalent to a standard-sized memory card, such as the dimensions of the MMC and Memory Stick. Thus, according to the present invention, the memory card 110 is removably interconnectable to the extension member 140 so that the memory card 110 with attached extension member 140 may be easily inserted into and removed from the standard-sized socket made for receiving the standard-sized memory card 100. Further, by simply removing the extension member 140, the reduced-in-size memory card 110 alone may be utilized in more compact, reduced-sized sockets. As such, the memory card 110 is interchangeable between the more compact reduced-sized sockets and the standard-sized sockets by simply connecting and removing the extension member 140.

FIGS. 5 and 6 illustrate a second embodiment or variation of the recesses of the first embodiment according to the present invention. In particular, the second embodiment is similar to the first embodiment in every respect, except there is only one front recess 220 and one back recess 230. In this embodiment, the memory card 210 includes a front surface 212 and back surface 214 with a peripheral side 216 therebetween and terminals exposed 218 on the front surface 212. The front recess 220 is provided partially in the peripheral side 216 and partially in the front surface 212 at an end portion of the memory card 210. Likewise, the back recess 230 is provided partially in the peripheral side 216 and back surface 214 at an end portion of the memory card 210. The front and back recesses 220 and 230 are similar in size and in a staggered relationship. Similar to the first embodiment, the front recess 220 and back recess 230 each include a respective upper floor 222, 232 and lower floor 229, 239 extending to a ledge 226, 236 between lateral side walls 224, 234, the lower floor 229, 239 extending to a ledge wall (not shown) and back wall 228, 238.

FIG. 7 illustrates the memory card 210 removably interconnected to an extension member 240 in the fully engaged position to form, as designated as 200, an assembly equivalent in size to a standard-sized memory card. The extension member 240 includes a first surface 242 and second surface 244 with biasing portions 246 extending from a peripheral side 245 in the plane of the extension member 240. The biasing portions 246 include end portions 248 configured the same as end portions 148 of the first embodiment at an end thereof to bias against the respective upper floors 222, 232 in the front and back recesses 220 and 230 and configured to removably interconnect with a corresponding front recess 220 and back recess 230 in the memory card 210, similar to the first embodiment. Further, as in the first embodiment, the extension member 240 and memory card 210 are easily interconnected via an attaching force $F_A$ and separated by applying a separating force $F_S$. The front recess 220 and back recess 230 arrangement of the second embodiment essentially provides a two-point engagement with the extension member 240.

FIGS. 8 and 9 illustrate respective front and back perspective views of a third embodiment of the locking mechanism in the memory card 310, depicting two front recesses 320 and one back recess 330 in the respective front surface 312 and back surface 314 of the memory card 310. Front surface 312 includes terminals 318 thereon. The front recesses 320 each include a floor 322, similar to the upper floor in the first embodiment, wherein the floor extends in width to lateral side walls 324 and extends from the peripheral side 316 to a ledge 326. The ledge 326 drops off into a through hole 328 extending to the opposing back surface 314. The back recess 330 may include a floor 332 extending to lateral side walls 334 and a back wall 338. As discussed further below, the floor 332 may be flat and extend in the plane of extension member 340. The back recess 330 may be arranged centrally at an end portion of the back surface 314 disposed between the through holes 329, which through holes 329 extend from the two front recesses 320 of the memory card 310.

FIGS. 10 and 11 illustrate the extension member 340 and the memory card 310 in an unassembled position and a fully engaged position, respectively, according to the third embodiment of the present invention. As before, the extension member 340 includes a first surface 342 and second surface 344 with biasing portions 346 extending from a peripheral side 345 of the extension member 340 and in the general plane thereof. The biasing portions 346 corresponding with the front recesses 320 include end portions 348 which may be structured as a protrusion or pawl extending along the width of the biasing portion 346 at an end thereof. By applying an attaching force $F_A$, such end portions 348 are configured to slidably engage with the floor 322 of the front recesses 320 until sliding over the ledge 326, wherein the end portions 348 extend into the through holes 329 for removable interconnection of the extension member 340 to the memory card 310 to provide an assembly 300 equivalent in size to a standard-sized memory card. Likewise, a separating force $F_S$ may be applied to the memory card 310 and extension member 340 for removal thereof.

FIG. 11a is a cross-sectional view taken along line 11a in FIG. 11, depicting the end portion 348 extending into the through hole 329 over the ledge 326 in the fully engaged position. The floor 322 of the recess may slope upwardly to provide an increasing biasing force on the biasing member 346 as the extension member 340 and memory card 310 are slidably engaged and moved together so that the end portions 348 snap into the through holes 329 to, thereby, removably interconnect the memory card 310 with the extension member 340. The end portions 348 include an inner surface 349 which is configured so that when a separating force $F_S$ is applied to separate the memory card 310 and extension member 340 (as indicated by the arrows in FIG. 11), such inner surface 349 is angled such that it slidably engages with the ledge 326 and moves upward to free the biasing portions 346 from the front recesses 320. With respect to the biasing portion 346' corresponding to the back recess 330, such biasing portion 346' may not include an end portion with the pawl structure but, rather, may comprise a planar portion configured as a tab extending in the plane of extension member 340 to slide on and closely abut with the floor 332 of the back recess 330 to serve as a guide and prevent flexure of the joined memory card 310 and extension member 340. In this manner, a third embodiment of the present invention provides a three-point contact comprising two points of engagement and an alignment point between the memory card 310 and the extension member 340.

FIGS. 12 and 13 illustrate respective front and back perspective views of a fourth embodiment of the locking mechanism in the memory card, depicting two front recesses 420 and one back recess 430 in the respective front surface 412 and back surface 414 of the memory card 410. Terminals 418 reside on front surface 412. The front recesses 420 are provided partially in a peripheral side 416 and partially in the front surface 412, wherein the front recesses 420 may include a floor 422 extending to a back wall 428 between two lateral side walls 424. Similarly, the back recess 430 is provided partially in the peripheral side 416 and the back surface 414, wherein the back recess 430 may include a floor 432 extending to a back wall 438 between two lateral side walls 434. The back recess 430 is centrally located at an end portion of the memory card 410 between the two front recesses 420 on the opposing front surface 412.

According to the fourth embodiment, each of the front recesses 420 may include a cavity 429 defined in one of the lateral side walls 424 proximate the back wall 428. More specifically, the inner one of the lateral side walls 424 extends toward the back wall 428 to a ledge 426, which extends into the cavity 429 proximate the back wall 428. Such cavity 429 is sized and configured to removably interconnect to an extension member 440.

Figure 14:
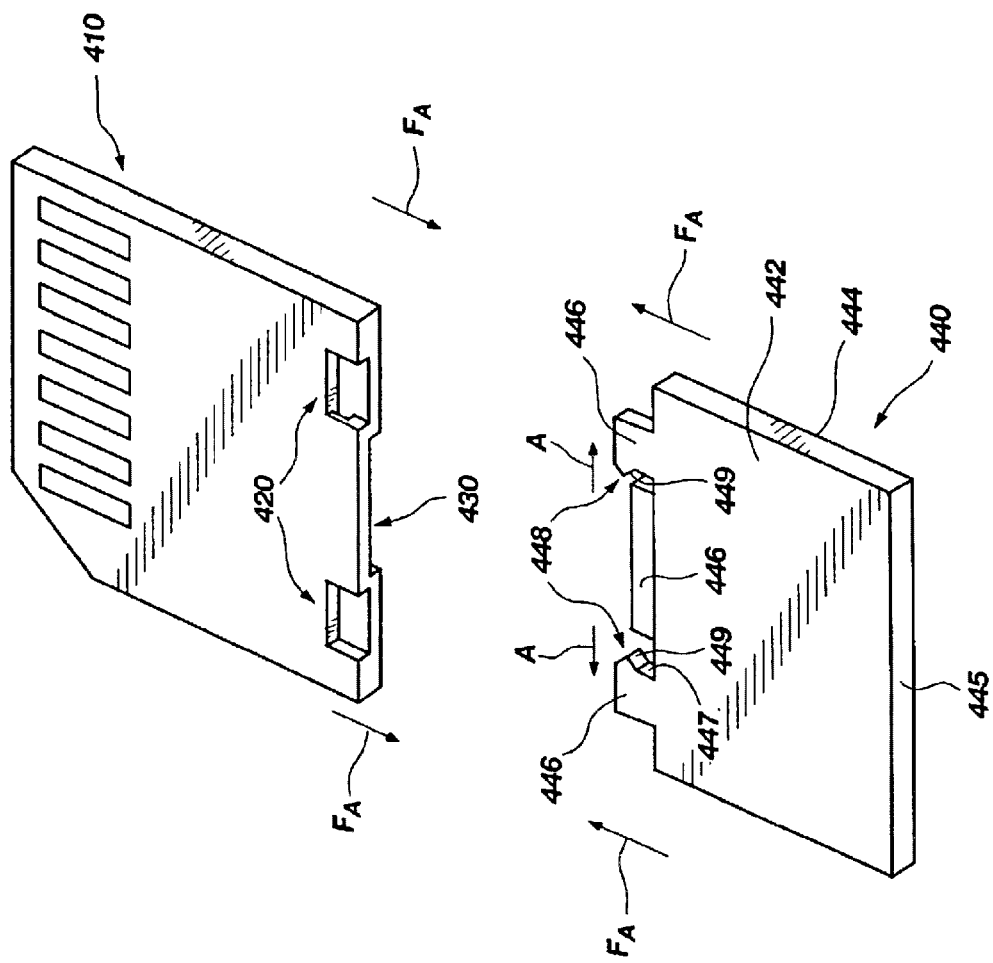
FIG. 14 illustrates a simplified perspective view of an extension member and the reduced-sized memory card in an unassembled position, according to the fourth embodiment of the present invention.

FIG. 14 illustrates an extension member 440 configured and positionally aligned to interconnect with the memory card 410 of the fourth embodiment. The extension member 440 includes a first surface 442 and second surface 444 with biasing portions 446 extending from a peripheral side 445 thereof. The biasing portions 446 include end portions 448 structured as a protrusion, extending from an inside end surface 447 of the biasing portion 446. By applying an attaching force $F_A$, the memory card 410 and extension member 440 are movable to the fully engaged position, wherein the end portions 448 are sized and configured to slidably engage with the inner ones of the lateral side walls 424 while the biasing portions 446 flex outward in a resilient manner, as indicated by arrows A, during such slidable engagement. The biasing portions 446 continue in the flexed position while slidably engaging the inner ones of the lateral side walls 424 until the end portions 448 move over the ledge 426, whereupon the end portions 448 snap into the cavities 429 for removable interconnection with the first recesses 420 of the memory card 410. Similar to that described in the earlier embodiments, the end portions 448 include an inner surface 449 angled such that the inner surface 449 slidably engages with the ledge 426 and flexes the biasing portions 446 outward when a separating force is applied to, therefore, easily allow the extension member 440 to separate from the memory card 410.

The biasing portion 446 configured to mate with the back recess 430 may be flexible or substantially rigid. This biasing portion 446 is sized and configured to slidably engage with the floor 432 of the back recess 430 in the manner previously discussed with respect to the third embodiment. With the front recesses 420 and back recess 430 of the fourth embodiment, a three-point contact interconnection may be made between the memory card 410 and the extension member 440.

FIGS. 15 and 16 illustrate perspective views of a front side surface and a back side surface, respectively, of a fifth embodiment of the locking mechanism in the memory card 510. In the fifth embodiment, an end portion of the memory card 510 includes a track 520 including a slot 522 defined in a peripheral side 516 between a front surface 512 and back surface 514 of the memory card 510. Terminals 518 reside on front surface 512. The slot 522 may extend along a width of the memory card 510 and, more particularly, from one peripheral side 516 to an opposing peripheral side 516 at the end portion of the memory card 510. The track 520 may also include a track recess 524 running substantially continuous along the width of the memory card 510. Alternatively, the slot 522 may extend only a partial distance of the width of the memory card so that the slot 522 extends from one peripheral side 516, but terminates before reaching the opposing peripheral side 516. In this alternative, the track recess 524 may substantially extend a width of the slot 522.

Figure 17:
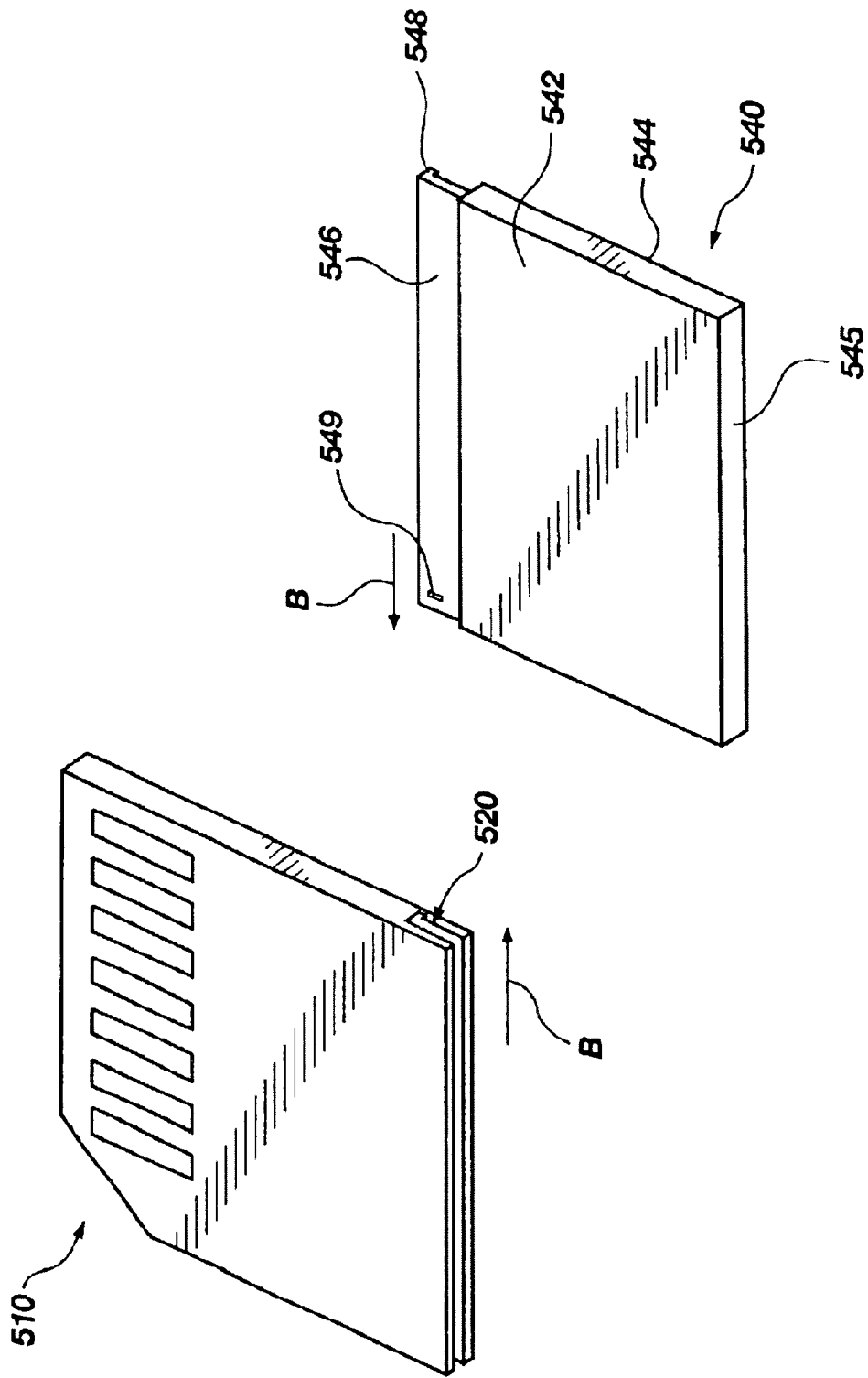
FIG. 17 illustrates a simplified perspective view of an extension member and the reduced-sized memory card in an unassembled position, according to the fifth embodiment of the present invention.

FIG. 17 illustrates that the track 520 in the memory card 510 is interconnectable with a suitably configured extension member 540. The extension member 540 having a first surface 542 and a second surface 544 may include an extension member track 546 formed at a peripheral side 545 of the extension member 540. The extension member track 546 may include an end portion 548 structured as a protrusion extending along a lateral extent of the end portion 548. The extension member track 546 and the end portion 548 thereon is sized and configured to correspond and slidingly fit through the slot 522 and track recess 524 formed in the end portion of the memory card 510. By this arrangement, the extension member track 546 on the extension member 540 may transversely slide through the slot 522 so that the end portion 548 aligns with and slidably engages with the track recess 524 in the slot 522, as indicated by arrows B. The extension member track 546 may include one or more nubs 549 that are configured to provide a snug fit between the extension track member 546 and the interior wall of slot 522. Further, the one or more nubs 549 may correspond to an indent (not shown) defined in a surface of the slot wall to provide a removably secured interconnection. Otherwise, the slot 522 in the memory card 510 may be sized and configured so that the extension member track 546 snugly fits therewith to provide the substantially secured interconnection that may be easily separated manually. It should be noted that slot 522 may be sized and configured to correspond with the extension member track 546 such that extension member track 546 may include any shape, such as an L-shape, T-shape, dove-tail shape or any suitable shape for providing a removably secure interconnection.

Figure 18:
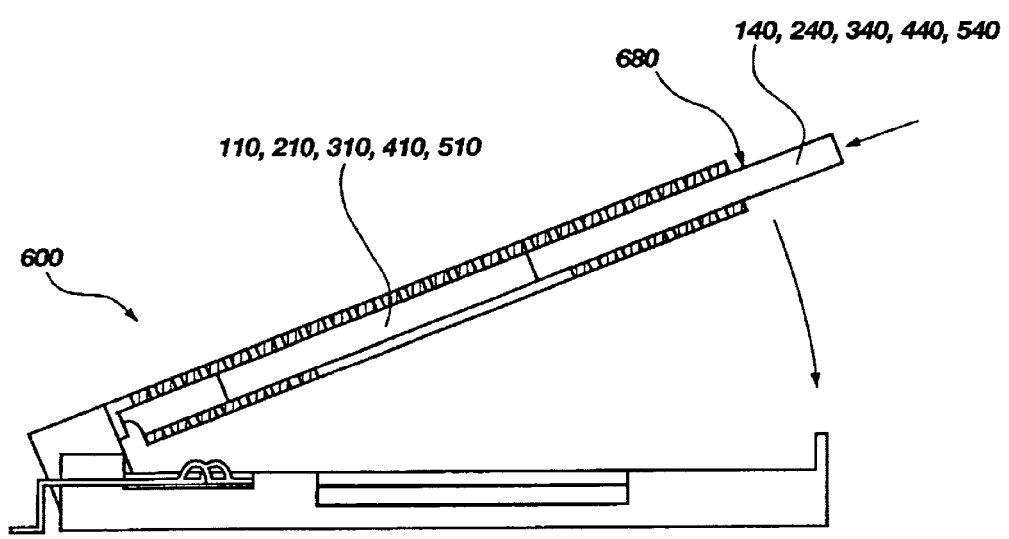
FIG. 18 illustrates a simplified side view of the reduced-sized memory card with the extension member assembled thereto being inserted into an electronic system, according to the present invention.

FIG. 18 depicts an electronic device 600 with a slot 680 sized and configured to receive a standard-sized memory card, such as the MMC and Memory Stick. According to the present invention, the memory card 110, 210, 310, 410, 510 is removably interconnected to the extension member 140, 240, 340, 440, 540 and may be easily insertable into the slot 680 and, more importantly, easily removable from the slot 680 due to the length of the memory card with the extension member interconnected thereto. Further, as indicated earlier, the extension member may be removed from the memory card and inserted into an electronic device configured with an ultra compact reduced-sized socket.

Figure 19:
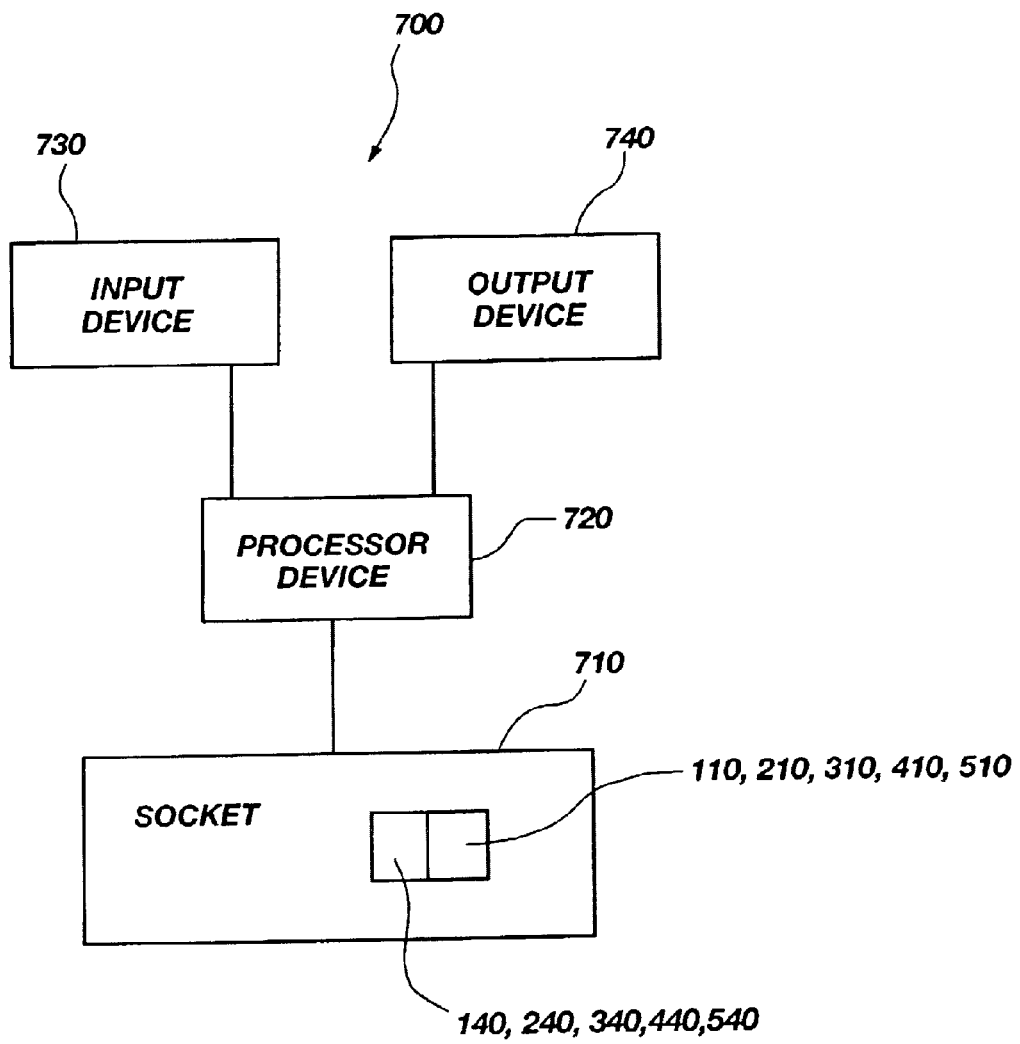
FIG. 19 illustrates a simplified block diagram of a semiconductor assembly of the present invention integrated in an electronic system.

As illustrated in block diagram form in drawing FIG. 19, a reduced-size memory card 110, 210, 310, 410 or 510 in combination with a respective extension member 140, 240, 340, 440 or 540 of the present invention may be inserted in a standard-sized or reduced-sized socket 710 in an electronic device or system 700. In the electronic system 700, the memory card and its respective socket 710 may be interconnected to a processor device 720 which communicates with an input device 730 and an output device 740. The input device 730 may comprise a keyboard, mouse, joystick, input buttons or any other type of electronic input device. The output device 740 may comprise a monitor or any type of display, printer, or any other type of output device. The processor device 720 may be, but is not limited to, a microprocessor or a circuit card including hardware for processing instructions for the electronic system 700. Additional structure for the electronic system 700 is readily apparent to those of ordinary skill in the art.

While the present invention has been disclosed in terms of certain preferred embodiments and alternatives thereof, those of ordinary skill in the art will recognize and appreciate that the invention is not so limited. Additions, deletions and modifications to the disclosed embodiments may be effected without departing from the scope of the invention as claimed herein. Similarly, features from one embodiment may be combined with those of another while remaining within the scope of the invention. For example, the extension member track formed on the extension member may, alternatively, be formed on an end portion of the memory card. Likewise, the slot formed in the memory card may alternatively be formed in the extension member for removable interconnection similar to that described in FIG. 17.

What is claimed is:

1. A card package configured to removably interconnect to an extension member, the card package comprising:
   a memory card including a first surface, a second surface and a peripheral side defining a thickness between the first surface and the second surface, one of the first surface and the second surface having a plurality of terminals exposed thereon, the terminals interconnecting with at least one integrated circuit within the memory card; and
   a locking mechanism including at least one recess in the first surface at an end portion of the memory card and at least one recess in the second surface at the end portion of the memory card, the at least one recess in the first surface including an entry surface and a ledge, the entry surface substantially extending from the peripheral side to the ledge, the entry surface configured to slidably receive at least one biasing portion of the extension member and the ledge configured to removably engage the at least one biasing portion of the extension member.

2. The package of claim 1, wherein the entry surface comprises a ramp extending to the ledge.

3. The package of claim 1, wherein the entry surface comprises a substantially protrusion-free surface.

4. The package of claim 1, wherein the entry surface comprises a substantially unobstructed surface.

5. The package of claim 1, wherein the at least one recess in the first surface comprises at least one floor, two lateral side walls, a ledge wall and a back wall, and wherein the at least one floor includes the entry surface, the entry surface extending laterally between the two lateral side walls.

6. The package of claim 5, wherein the at least one floor comprises a lower floor and the entry surface, and wherein the lower floor extends below the ledge from the ledge wall.

7. The package of claim 5, wherein the ledge wall is configured to removably engage an end of the at least one biasing portion of the extension member.

8. The package of claim 5, wherein the at least one recess in the first surface comprises a through hole defined by a back portion of the two lateral side walls, the ledge wall and the back wall, and wherein the through hole is configured to receive an end of the at least one biasing portion of the extension member.

9. The package of claim 8, wherein the at least one recess in the second surface comprises a continuous, substantially planar surface for slidably engaging with another one of the at least one biasing portion of the extension member.

10. The package of claim 1, wherein the at least one recess in the second surface includes an entry surface and a ledge, the entry surface in the second surface substantially extending from the peripheral side to the ledge in the second surface, the entry surface configured to slidably receive another one of the at least one biasing portion of the extension member and the ledge in the second surface configured to removably engage the another one of the at least one biasing portion of the extension member.

11. The package of claim 10, wherein the at least one recess in the second surface comprises at least one floor, two lateral side walls, a ledge wall and a back wall, wherein the at least one floor includes the entry surface in the second surface, the entry surface in the second surface extending laterally between the two lateral side walls.

12. The package of claim 10, wherein the entry surface in the at least one recess of the second surface comprises a ramp extending to the ledge in the second surface.

13. The package of claim 10, wherein the entry surface in the at least one recess of the second surface comprises a substantially protrusion-free surface.

14. The package of claim 10, wherein the entry surface in the second surface comprises a substantially unobstructed surface.

15. The package of claim 1, wherein the at least one recess in the first surface comprises a floor and at least one side wall having a cavity therein configured to receive a distal end of the at least one biasing portion of the extension member, the entry surface comprising the at least one side wall.

16. The package of claim 1, wherein the memory card comprises a polymeric material substantially enclosing the at least one integrated circuit therein.

17. A card package selectably removably interconnectable with a standard-sized socket and a reduced-sized socket, the card package comprising:
   a memory card including a first surface, a second surface and a peripheral side having a thickness defined between the first surface and the second surface, one of the first surface and the second surface having a plurality of terminals exposed thereon, the terminals interconnecting with at least one integrated circuit within the memory card, the memory card sized and configured to interconnect with the reduced-sized socket;
   an extension member including a first surface, a second surface and a peripheral side therebetween, the peripheral side having at least one biasing portion projecting therefrom in a plane of the extension member; and
   a locking mechanism formed in the memory card, the locking mechanism including at least one recess in the first surface at an end portion of the memory card and at least one recess in the second surface at the end portion of the memory card, the at least one recess in the first surface including an entry surface and a ledge, the entry surface substantially extending from the peripheral side to the ledge, the entry surface configured to slidably engage with the at least one biasing member of the extension member and the ledge configured to removably interconnect the at least one biasing portion of the extension member.

18. The package of claim 17, wherein the entry surface comprises a ramp extending to the ledge.

19. The package of claim 17, wherein the entry surface comprises a substantially protrusion-free surface.

20. The package of claim 17, wherein the entry surface comprises a substantially unobstructed surface.

21. The package of claim 17, wherein the at least one recess of the first surface comprises at least one floor, two lateral side walls, a ledge wall and a back wall, and wherein the at least one floor includes the entry surface, the entry surface extending laterally between the two lateral side walls.

22. The package of claim 21, wherein the at least one floor comprises a lower floor and the entry surface, and wherein the lower floor extends below the ledge from the ledge wall.

23. The package of claim 21, wherein the ledge wall is configured to removably engage an end of the at least one biasing portion of the extension member.

24. The package of claim 21, wherein the at least one recess in the first surface comprises a through hole defined by a back portion of the two lateral side walls, the ledge wall and the back wall, and wherein the through hole is configured to receive an end of the at least one biasing portion of the extension member.

25. The package of claim 24, wherein the at least one recess in the second surface comprises a substantially planar surface for slidably engaging with another one of the at least one biasing portion of the extension member.

26. The package of claim 17, wherein the at least one recess in the second surface includes an entry surface and a ledge, the entry surface in the second surface substantially extending from the peripheral side to the ledge in the second surface, the entry surface configured to slidably engage with another one of the at least one biasing portion of the extension member and the ledge configured to removably engage the another one of the at least one biasing portion of the extension member.

27. The package of claim 26, wherein the at least one recess in the second surface comprises at least one floor, two lateral side walls, a ledge wall and a back wall, wherein the at least one floor includes the entry surface, the entry surface extending laterally between the two lateral side walls.

28. The package of claim 26, wherein the entry surface in the at least one recess in the second surface comprises a ramp extending to the ledge in the second surface.

29. The package of claim 26, wherein the entry surface in the at least one recess in the second surface comprises a substantially protrusion-free surface.

30. The package of claim 26, wherein the entry surface comprises a substantially unobstructed surface.

31. The package of claim 17, wherein the at least one recess in the first surface comprises a floor and at least one side wall, the entry surface comprising the at least one side wall.

32. The package of claim 17, wherein the memory card comprises a polymeric material substantially enclosing the at least one integrated circuit therein.

33. The package of claim 17, wherein the at least one biasing portion comprises at least one of a polymeric material and a spring steel material.

34. The package of claim 17, wherein the at least one biasing portion comprises a resilient flexible material.

35. A method of forming a card package for removably securing to an extension member, the method comprising:
   forming a memory card including a first surface, a second surface and a peripheral side defining a thickness between the first surface and the second surface, one of the first surface and the second surface having a plurality of terminals exposed thereon, the terminals interconnecting with at least one integrated circuit within the memory card;
   forming a locking mechanism in the memory card including at least one recess in the first surface at an end portion of the memory card and at least one recess in the second surface at the end portion of the memory card; and
   configuring the at least one recess in the first surface including an entry surface and a ledge, the entry surface substantially extending from the peripheral side to the ledge, the entry surface configured to slidably receive at least one biasing portion of the extension member and the ledge configured to removably engage the at least one biasing portion of the extension member.

36. The method of claim 35, wherein the configuring comprises configuring the entry surface to include a ramp extending to the ledge.

37. The method of claim 35, wherein the configuring comprises configuring the entry surface with a substantially protrusion-free surface.

38. The method of claim 35, wherein the configuring comprises configuring the entry surface with a substantially unobstructed surface.

39. The method of claim 35, wherein the configuring comprises configuring the at least one recess in the first surface to include at least one floor, two lateral side walls, a ledge wall and a back wall, and wherein the at least one floor includes the entry surface, the entry surface extending laterally between the two lateral side walls.

40. The method of claim 39, wherein the configuring the at least one floor comprises configuring the at least one floor to include a lower floor and the entry surface, and wherein the lower floor extends below the ledge from the ledge wall.

41. The method of claim 39, wherein the configuring further comprises configuring the ledge wall to removably engage an end of the at least one biasing portion of the extension member.

42. The method of claim 39, wherein the configuring further comprises configuring a through hole in the at least one recess in the first surface defined by a back portion of the lateral side walls, the ledge wall and the back wall, and configuring the through hole for receiving an end of the at least one biasing portion of the extension member.

43. The method of claim 42, wherein the forming the at least one recess in the second surface comprises configuring the at least one recess in the second surface with a continuous, substantially planar surface for slidably engaging with another one of the at least one biasing portion of the extension member.

44. The method of claim 35, wherein the forming the at least one recess in the second surface comprises forming an entry surface and a ledge in the second surface, the entry surface in the second surface substantially extending from the peripheral side to the ledge in the second surface, the entry surface in the second surface configured to slidably engage with another one of the at least one biasing portion of the extension member and the ledge in the second surface configured to removably engage the another one of the at least one biasing portion of the extension member.

45. The method of claim 44, wherein the forming the at least one recess in the second surface comprises forming at least one floor, two lateral side walls, a ledge wall and a back wall, wherein the at least one floor includes the entry surface in the second surface, the entry surface in the second surface extending laterally between the two lateral side walls.

46. The method of claim 44, wherein the forming the entry surface in the second surface comprises extending a ramp to the ledge in the second surface.

47. The method of claim 44, wherein the forming the entry surface in the second surface comprises configuring the entry surface in the second surface with a substantially protrusion-free surface.

48. The method of claim 44, wherein the forming the entry surface in the second surface comprises configuring the entry surface in the second surface with a substantially unobstructed surface.

49. The method of claim 35, wherein the forming the at least one recess in the first surface comprises forming a floor and at least one side wall having a cavity therein configured to receive a distal end of the at least one biasing portion of the extension member, the entry surface comprising the at least one side wall.

50. The method of claim 35, wherein the forming the memory card comprises forming the memory card from a polymeric material substantially enclosing the at least one integrated circuit therein.

51. A method of removably interconnecting an adaptor to a reduced-sized card package to fit in a standard-sized socket, the method comprising:

providing a memory card including a first surface, a second surface and a peripheral side defining a thickness between the first surface and the second surface, one of the first surface and the second surface having a plurality of terminals exposed thereon, the terminals interconnecting with at least one integrated circuit within the memory card, the memory card including at least one recess in the first surface at an end portion of the memory card and at least one recess in the second surface at the end portion of the memory card, the at least one recess in the first surface including an entry surface and a ledge, the entry surface substantially extending from the peripheral side to the ledge;

providing an extension member including a first surface, a second surface and a peripheral side therebetween, the peripheral side having at least one biasing portion projecting therefrom in a plane of the extension member; and removably interconnecting the extension member to the memory card by slidably engaging the at least one biasing portion over the entry surface from the peripheral side of the memory card toward the ledge so that a portion of the at least one biasing portion slidably snaps over the ledge.

52. The method of claim 51, wherein the providing the extension member comprises configuring the at least one biasing portion with an end protrusion for slidably biasing with the entry surface and for removably interconnecting with the ledge.

53. The method of claim 52, wherein the configuring the end protrusion comprises configuring the end protrusion with at least one of a rounded portion and a pawl portion.

54. The method of claim 51, wherein the removably interconnecting comprises aligning the at least one biasing portion with the entry surface in a pre-interconnection position.

55. The method of claim 51, wherein the removably interconnecting comprises slidably engaging the at least one biasing portion with the entry surface so that the entry surface exerts a biasing force on the at least one biasing portion.

56. The method of claim 55, wherein the providing the memory card comprises configuring the entry surface as a ramp so that as the at least one biasing portion slidably engages the entry surface, the exerted biasing force increases from the peripheral side of the memory card to the ledge.

57. The method of claim 55, wherein the providing the memory card comprises configuring the entry surface as a substantially protrusion-free surface.

58. The method of claim 55, wherein the providing the memory card comprises configuring the entry surface as a substantially smooth surface.

59. The method of claim 51, wherein the removably interconnecting further comprises removing the memory card from the extension member.

60. An electronic system comprising:
a processor device coupled to an input device and an output device; and
a card package coupled to at least one of the processor device, the input device and the output device, the card package configured to removably interconnect with an extension member having at least one biasing portion, the card package comprising:
a memory card including a first surface, a second surface and a peripheral side defining a thickness between the first surface and the second surface, one of the first surface and the second surface having a plurality of terminals exposed thereon, the terminals interconnecting with at least one integrated circuit within the memory card; and a locking mechanism including at least one recess in the first surface at an end portion of the memory card and at least one recess in the second surface at the end portion of the memory card, the at least one recess in the first surface including an entry surface and a ledge, the entry surface substantially extending from the peripheral side to the ledge, the entry surface configured to slidably engage with at least one biasing portion of the extension member and the ledge configured to removably engage the at least one biasing portion of the extension member.

61. The electronic system of claim 60, wherein the entry surface comprises a ramp extending to the ledge.

62. The electronic system of claim 60, wherein the entry surface comprises a substantially protrusion-free surface.

63. The electronic system of claim 60, wherein the entry surface comprises a substantially unobstructed surface.

64. The electronic system of claim 60, wherein the at least one recess in the first surface comprises at least one floor, two lateral side walls, a ledge wall and a back wall, and wherein the at least one floor includes the entry surface, the entry surface extending laterally between the two lateral side walls.

65. The electronic system of claim 64, wherein the at least one floor comprises a lower floor and the entry surface, and wherein the lower floor extends below the ledge from the ledge wall.

66. The electronic system of claim 64, wherein the ledge wall is configured to removably engage an end of the at least one biasing portion of the extension member.

67. The electronic system of claim 64, wherein the at least one recess in the first surface comprises a through hole defined by a back portion of the two lateral side walls, the ledge wall and the back wall, and wherein the through hole is configured to receive an end of the at least one biasing portion of the extension member.

68. The electronic system of claim 67, wherein the at least one recess in the second surface comprises a substantially planar surface for slidably engaging with another one of the at least one biasing portion of the extension member.

69. The electronic system of claim 60, wherein the at least one recess in the second surface includes an entry surface and a ledge, the entry surface in the second surface substantially extending from the peripheral side to the ledge in the second surface, the entry surface in the second surface configured to slidably engage with another one of the at least one biasing portion of the extension member and the ledge in the second surface configured to removably secure the another of the at least one biasing portion of the extension member.

70. The electronic system of claim 69, wherein the at least one recess in the second surface comprises at least one floor, two lateral side walls, a ledge wall and a back wall, wherein the at least one floor includes the entry surface in the second surface, the entry surface in the second surface extending laterally between the two lateral side walls.

71. The electronic system of claim 69, wherein the entry surface of the at least one recess in the second surface comprises a ramp extending to the ledge in the second surface.

72. The electronic system of claim 69, wherein the entry surface of the at least one recess in the second surface comprises a substantially protrusion-free surface.

73. The electronic system of claim 69, wherein the entry surface in the second surface comprises a substantially unobstructed surface.

74. The electronic system of claim 60, wherein the at least one recess in the first surface comprises a floor and at least one side wall having a cavity therein configured to receive a distal end of the at least one biasing portion of the extension member, the entry surface comprising the at least one side wall.

75. The electronic system of claim 60, wherein the memory card comprises a polymeric material substantially enclosing the at least one integrated circuit therein.

* * * * *

UNITED STATES PATENT AND TRADEMARK OFFICE
CERTIFICATE OF CORRECTION

PATENT NO. : 6,865,086 B2  Page 1 of 1
APPLICATION NO. : 10/191139
DATED : March 8, 2005
INVENTOR(S) : Derek J. Gochnour, Walter L. Moden and Michael W. Morrison It is certified that error appears in the above-identified patent and that said Letters Patent is hereby corrected as shown below:

In the claims:
CLAIM 42, COLUMN 15, LINES 19-20, change "of the lateral side walls," to -- of the two lateral side walls,--

Signed and Sealed this

Thirtieth Day of October, 2007

JON W. DUDAS
*Director of the United States Patent and Trademark Office*